United States Patent
Kalbassi et al.

(10) Patent No.: US 6,907,751 B2
(45) Date of Patent: Jun. 21, 2005

(54) LIQUID DISTRIBUTOR

(75) Inventors: Mohammad A. Kalbassi, Weybridge (GB); Ian R. Zone, Woking (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/620,158

(22) Filed: Jul. 14, 2003

(65) Prior Publication Data

US 2004/0020238 A1 Feb. 5, 2004

(30) Foreign Application Priority Data

Jul. 30, 2002 (EP) ............................................. 2255310

(51) Int. Cl.⁷ ............................... F25J 3/00; F25J 5/00; B01D 3/14; B01D 47/00; C10J 1/08
(52) U.S. Cl. ........................... 62/617; 62/905; 202/158; 261/19; 261/110
(58) Field of Search ........................ 62/617, 620, 643, 62/905; 202/158, 83; 261/19, 110

(56) References Cited

U.S. PATENT DOCUMENTS

| | | | |
|---|---|---|---|
| 4,472,325 A | * | 9/1984 | Robbins ....................... 261/96 |
| 4,565,216 A | * | 1/1986 | Meier ...................... 137/561 A |
| 4,808,350 A | | 2/1989 | Killat et al. |
| 5,699,671 A | * | 12/1997 | Lockett et al. ................... 62/63 |
| 5,984,282 A | | 11/1999 | Armstrong et al. ......... 261/112.2 |
| 6,149,136 A | * | 11/2000 | Armstrong et al. ............ 261/19 |
| 6,249,053 B1 | * | 6/2001 | Nakata et al. ............... 257/738 |
| 6,294,053 B1 | | 9/2001 | Darredeau .................... 202/158 |
| 6,338,774 B1 | | 1/2002 | Lehman ........................ 202/83 |
| 6,395,138 B1 | * | 5/2002 | Darredeau et al. ........... 202/158 |
| 2002/0079597 A1 | * | 6/2002 | Bartlok ......................... 261/97 |

FOREIGN PATENT DOCUMENTS

| | | | |
|---|---|---|---|
| DE | 1113680 | 9/1961 | |
| EP | 0930088 | 7/1999 | ............ B01D/3/16 |

* cited by examiner

Primary Examiner—William C. Doerrler
(74) Attorney, Agent, or Firm—Willard Jones, II

(57) ABSTRACT

Liquid is distributed substantially uniformly in a liquid-vapour separation column 22 located on an off-shore floating platform using a liquid distributor 24 characterised in that (i) the distance between the two apertures that are furthest apart in the or each secondary distributor is such that the liquid distributor provides, at each angle of tilt, a standard deviation of liquid flow rates through the apertures of the or each secondary distributor that is less than a first predetermined maximum for all angles of tilt; and (ii) the difference in flow rate between the aperture having maximum liquid flow and the aperture having minimum liquid flow in the or each secondary distributor at each angle of tilt is less than a second predetermined maximum for all angles of tilt.

30 Claims, 8 Drawing Sheets

A

B

C

LIQUID DISTRIBUTOR

BACKGROUND OF THE INVENTION

The present invention relates to a liquid distributor and in particular, but not necessarily limited to, a liquid distributor for distributing a liquid substantially uniformly across a liquid-vapour separation column located on an off-shore floating platform such as a ship.

Liquid distributors are used to distribute liquid uniformly over an area. Uniform distribution is important for efficient separation, especially if the separation is thermodynamically difficult.

By way of an example, liquid distributors are used to uniformly distribute a cryogenic liquid over the packing in the cryogenic distillation column of an air separation unit (or "ASU"). Uniform distribution is ideal. However, this is very difficult to achieve in practice and, thus, most commercial column packings are able to redistribute the liquid to some extent if the distribution is not uniform. Therefore, in most commercial applications, some non-uniformity of liquid distribution is acceptable.

In the prior art, there are two main types of liquid distributor, an open (e.g. channel) distributor and a closed (e.g. pipe) distributor. In the open distributor, the liquid is usually distributed under gravity via apertures (normally holes) located in the bottom of a series of open channels. The liquid is in contact with the surrounding vapour and, thus, the distributor cannot be pressurised. The closed distributor is usually made from pipes. The liquid is not in contact with the surrounding vapour and can be pressurised.

A typical design of open channel distributor has two sections, a primary distributor in fluid communication with a secondary distributor. The primary distributor reduces the velocity of the incoming liquid and evens out the flow. It may be in two-way fluid communication with the secondary distributor. The secondary distributor is responsible for the final distribution of the liquid, for example, on to the packing of the column of an ASU. All parts of the secondary distributor are in two-way fluid communication with each other. The liquid usually leaves the distributor via one or more apertures and relies solely on liquid head, i.e. gravity, to make the liquid flow. To achieve uniform distribution, the liquid head must be substantially constant when flow division occurs, especially in the secondary distributor above the final distribution points.

In practice, there is always a slight hydraulic gradient along the distributor in order for the liquid to flow from one point to another. Distribution points at the outer edges of the secondary distributor, furthest from the liquid entry point, have slightly less head then those points nearer the middle. This difference can be significant on very large columns. In addition, if the distributor is not in horizontal alignment, non-uniform distribution of the liquid will be observed.

In typical ASUs, the accuracy of liquid distribution required is very high, often less than a 5% standard deviation across the distributor, in order to obtain high purity products from thermodynamically difficult separations. This results in a need to build expensive high quality distributors. However, some off-shore as well as land-based applications could require only low purity products and, thus, the separation becomes thermodynamically easier and the quality of liquid distribution is not as critical.

When an open channel distributor is not mounted horizontally or is mounted in a moving plane, for example onboard a ship, then the liquid distribution will vary as the distributor moves out of horizontal alignment. In this situation, the liquid is not evenly distributed within the distributor. On a large column, this can cause a significant change in the uniformity of distribution, in particular at turndown when the level of liquid in the distributor is reduced and the resultant flow rates become more sensitive to motion or to a permanent tilt.

One way to mitigate this problem is to use a closed distributor and to use a pump to move the liquid through the distributor under pressure rather than use gravity. The higher pressure head from the pump reduces the impact of the change in liquid head due to gravity as the distributor tilts. However, the use of a pump increases the capital and operating costs of the separation process, often requires a back-up pump and uses electricity in a possibly hazardous environment. Alternatively, the liquid head due to gravity can be increased by using a higher liquid level, thereby reducing the change in liquid head observed as the distributor tilts. However, this increases the distance between the distributor and the centre of rotation which magnifies the adverse effects of the motion of the sea on the liquid distributor. Therefore, a balance between these two factors needs to be reached. Further, available space is usually limited on board a ship or off-shore platform and, thus, the size of the apparatus is restricted.

U.S. Pat. No. 4,565,216 (Meier; published on Jan. 21, 1986), U.S. Pat. No. 6,294,053 (Darredeau; published on Sep. 25, 2001) and U.S. Pat. No. 6,395,138 (Darredeau et al; published on May 28, 2002) each discloses liquid distributors for liquid-vapour separation columns located on floating platforms. Each liquid distributor has a primary distribution zone in fluid communication with at least one secondary distributor and the or each secondary distributor distributes liquid over the upper surface of packing within the column through a plurality of apertures. However, none of these references refers to a specific relationship between the two apertures that are furthest apart in the or each secondary distributor, a specific relationship between the arrangement of the or each secondary distributor and the column packing or the importance to distributor design of the type of separation occurring in the column.

A cryogenic distillation column is usually packed with structured packing. Typically, the packing consists of a plurality of corrugated, perforated sheets of metal which are arranged vertically in parallel throughout the column. However, it is known to pack a column in sections with each section consisting of a number of these packing sheets arranged vertically and in parallel but which, as a section, are orientated at an angle to a neighbouring column packing section. For example, U.S. Pat. No. 5,984,282 (Armstrong et al; published on Nov. 16, 1999), the disclosure of which is incorporated herein by reference, discloses a number of arrangements of structured packing for liquid-vapour contact columns. However, only one liquid distributor is disclosed for use with every arrangement of structured packing. In other words, the distributor is not designed with a specific arrangement of packing in mind. The distributor in question is that disclosed in U.S. Pat. No. 6,149,136.

U.S. Pat. No. 6,149,136 (Armstrong et al; published on Nov. 21, 2001) discloses a liquid distributor comprising a header tank in fluid communication with rows of reservoir cells in a liquid distribution plate located above the structured packing of a ship-board cryogenic distillation column. The distribution plate is a circular disc covering the whole cross section of the column and has identical bores of square cross section formed therein in uniform criss-cross rows.

Alternate bores (vapour riser passages) are open at both the top and bottom to permit free flow of vapour therethrough and the remaining bores (reservoir cells) are blind being closed at their bases except for a central hole permitting limited flow of liquid therethrough.

U.S. Pat. No. 6,338,774 (Lehman; published on Jan. 15, 2002) discloses an open liquid distributor for use with an air distillation column on a floating platform or a barge. The distributor works by distributing liquid from a point in a receptacle to a point on the packing of the column that is not in vertical alignment with the point in the receptacle. One of the embodiments of the distributor comprises a two-stage distribution configuration. The first stage is an upwardly opening receptacle having a number of openings in the bottom of the receptacle that are disposed in a single crown adjacent to the peripheral wall. At a lower level is located a second stage for local distribution of the liquid comprising a number of regularly spaced, upwardly opening secondary receptacles, each having a perforated bottom. Each secondary receptacle has a smaller diameter then the first stage receptacle and is supplied by two tubes, themselves supplied respectively by two diametrically opposed openings in the first stage receptacle. In this way, each secondary receptacle should continue to be supplied by the first stage receptacle irrespective of the inclination of the distributor.

There is a need for an improved distributor that is less costly to manufacture and is still effective in maintaining an acceptably uniform distribution of liquid while the distributor is moved out of horizontal alignment. The primary objective of embodiments of the present invention is to distribute liquid in a sufficiently uniform manner, possibly under pressure, on to the top layer of packing such that an effective separation can be achieved despite movement or permanent tilt of the distributor. In addition, there is a need for an improved distributor for use with columns having awkward or complicated arrangements of multiple sections of structured packing. Another objective of embodiments of the present invention is to distribute liquid in a sufficiently uniform manner, possibly under pressure, on to the top layer of such packing such that separation can be achieved regardless of the packing arrangement. In addition, it is desirable that the distributor has low capital and operating costs and is easy to build.

BRIEF SUMMARY OF THE INVENTION

According to a first aspect of the present invention, there is provided apparatus comprising, in fluid communication, a liquid distributor and a liquid-vapour separation column tiltable from the vertical, said liquid distributor comprising a primary distribution zone and at least one secondary distributor, said primary distribution zone being in fluid communication with the or each secondary distributor and the or each secondary distributor having a plurality of liquid distribution apertures providing said fluid communication between the liquid distributor and the column, said apparatus being characterised in that:

(i) the distance between the two apertures that are furthest apart in the or each secondary distributor (the "characteristic length") is such that the liquid distributor provides, at each angle of tilt, a standard deviation of liquid flow rates through the apertures of the or each secondary distributor that is less than a first predetermined maximum for all angles of tilt; and (ii) the difference in flow rate between the aperture having maximum liquid flow and the aperture having minimum liquid flow in the or each secondary distributor at each angle of tilt is less than a second predetermined maximum for all angles of tilt, said first and second predetermined maxima being determined by the required degree of liquid-vapour separation.

According to a second aspect of the present invention, there is provided liquid distributor for use in liquid-vapour separation processes, said liquid distributor comprising a primary distributor zone and at least one secondary distributor, said primary distributor zone being in fluid communication with the or each secondary distributor and the or each secondary distributor having a plurality of liquid distribution apertures, said liquid distributor being characterised in that the total cross sectional area of said primary distributor zone defined by the outer periphery thereof is less than the corresponding cross sectional area of the or each secondary distributor. The liquid distributor may comprise any combination of features described above.

According to a third aspect of the present invention, there is provided an off-shore floating tiltable platform comprising apparatus that comprises, in fluid communication, a liquid distributor and a liquid-vapour separation column, said liquid distributor comprising a primary distribution zone and at least one secondary distributor, said primary distribution zone being in fluid communication with the or each secondary distributor and the or each secondary distributor has a plurality of liquid distribution apertures providing said fluid communication between the liquid distributor and the column, said platform being characterised in that:

(i) the distance between the two apertures that are furthest apart in the or each secondary distributor (the "characteristic length") is such that the liquid distributor provides, at each angle of tilt, a standard deviation of liquid flow rates through the apertures of the or each secondary distributor that is less than a first predetermined maximum for all angles of tilt; and (ii) the difference in flow rate between the aperture having maximum liquid flow and the aperture having minimum liquid flow in the or each secondary distributor at each angle of tilt is less than a second predetermined maximum for all angles of tilt, said first and second predetermined maxima being determined by the required degree of liquid-vapour separation. The apparatus may have any of the features described above.

According to a fourth aspect, there is provided use of apparatus according to the first aspect to provide uniform or substantially uniform liquid flux per element.

DETAILED DESCRIPTION OF THE INVENTION

Figure 1:
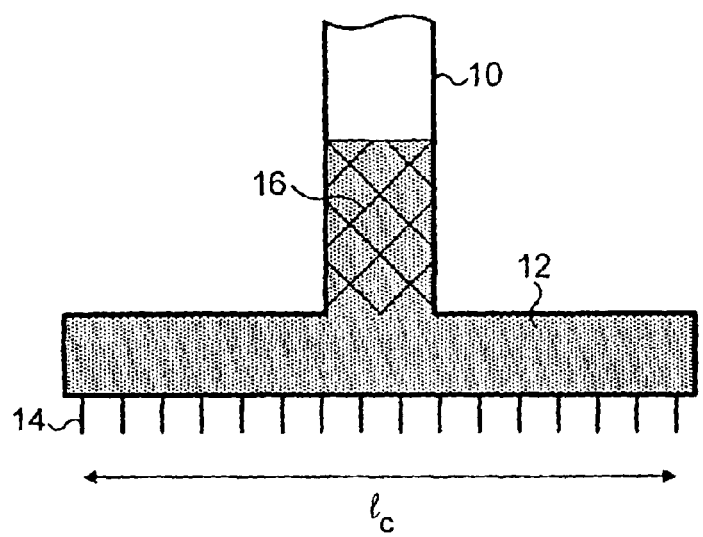
FIG. 1 is a diagrammatic cross-sectional representation of a secondary distributor.

The apparatus of the present invention comprises, in fluid communication, a liquid distributor and a liquid-vapour separation column tiltable from the vertical. The liquid distributor comprises a primary distribution zone and at least one secondary distributor, the primary distribution zone being in fluid communication with the or each secondary distributor and the or each secondary distributor having a plurality of liquid distribution apertures providing said fluid communication between the liquid distributor and the column. The apparatus is characterised in that:

(i) the distance between the two apertures that are furthest apart in the or each secondary distributor (the "characteristic length") is such that the liquid distributor provides, at each angle of tilt, a standard deviation of liquid flow rates through the apertures of the or each secondary distributor that is less than a first predetermined maximum for all angles of tilt; and (ii) the difference in flow rate between the aperture having maximum liquid flow and the aperture having minimum liquid flow in the or each secondary distributor at each angle of tilt is less than a second predetermined maximum for all angles of tilt, the first and second predetermined maxima being determined by the required degree of liquid-vapour separation.

One advantage of preferred embodiments of the present invention is that the distributor provides uniform, or at least substantially uniform, liquid flux per element, e.g. sheet of structured column packing.

The liquid flow rate through a distribution aperture (with liquid above the aperture) may be calculated approximately using the following equation:

$$Q = A \cdot C_D \sqrt{\frac{2 \cdot \delta \rho \cdot h}{\rho}}$$

where

Q=volumetric flow rate;
A=cross-sectional area of aperture;
$C_D$=aperture discharge coefficient;

$\delta \rho$=difference between liquid and vapour density;
$\rho$=liquid density; and
h=height of liquid above aperture.

For a given plurality of apertures arranged in a pattern on a flat secondary distributor base, the value of "h" for each aperture will be different when the liquid distributor is tilted out of horizontal alignment and, thus, the rate of liquid flow will be different from one aperture to the next.

The quality of the distribution is directly related to the thermodynamic difficulty of separation, i.e. the dimensions of the or each second secondary distributor is such that the final distribution of liquid on to the packing is acceptable.

For a given liquid-vapour separation, two factors are important if the liquid distributor is to provide a sufficient quality of liquid distribution. These factors are:

(a) the standard deviation of liquid flow rates through the apertures across a secondary distributor is below a first predetermined maximum; and (b) the difference between the minimum and maximum liquid flow rates through any two apertures of the secondary distributor is below a second predetermined maximum.

If the locations of the apertures are known, it is possible to calculate a maximum angle of tilt for the liquid distributor that results in both this standard deviation and this difference being kept below the relevant maximum figures. Therefore, given a maximum expected angle of tilt for the liquid distributor, the required standard deviation of liquid flow rates, the differences between the minimum and maximum liquid flow rates and the aperture pattern, it is possible to calculate the maximum distance that the two apertures that are furthest apart in the secondary distributor can be separated. This maximum distance is referred to as the "characteristic length" of the secondary distributor and effectively determines the maximum size of secondary distributor which can be used. The calculation is independent of the shape of the secondary distributor as it is only dependent on the relative location of the apertures.

The characteristic length "$l_c$" may be calculated from the following equation:

$$\frac{Q_{i-j}}{Q_{ave}} = A \cdot C_D \left( \sqrt{\frac{2 \cdot \delta \rho}{\rho}} \right) \left( \sqrt{h_i} - \sqrt{h_i - l_c \cdot \sin \theta} \right)$$

where $Q_{i-j}$=difference in volumetric flow rate between holes i & j;
$Q_{ave}$=average flow through the holes; and
$\theta$=angle of distributor tilt.

The standard deviation of all the apertures within the secondary distributor can be calculated by the equation:

$$std.dev. = \sqrt{\frac{[n \sum Q_i^2 - (\sum Q_i)^2]}{n^2}}$$

where n=number of apertures;

If the size of the or each secondary distributor is less than the characteristic length, the flow rate of all the streams leaving the distributor will be within the acceptable standard deviation of flows when the column is tilted. The acceptable standard deviation of flows is determined by the thermodynamic difficulty of the separation; some separations are more difficult than others and will require more uniform liquid distribution. This can be determined from the approach of the operating line to the equilibrium line for the separation being considered. Once the operating line intersects the equilibrium line the separation stops. Therefore, the standard deviation of the flows and the relative difference between any two apertures is acceptable when the gradient of the operating line can be changed by that amount but would not result in the operating line crossing the equilibrium line.

Typically, air separation requires highly uniform distribution but for offshore and some land-based applications, the quality or recovery rate of products can be relaxed. By carefully matching the quality of liquid distribution to the specific separation conditions, it is possible to reduce the need for high quality distribution. As long as the characteristic length is selected such that, when the distributor is tilted or in motion, the standard deviation of flows from the distributor is acceptable, then the separation will be acceptably efficient despite some loss in separation due to a mismatch in liquid and vapour flow rates at various points across the packing.

The total cross-sectional area of said primary distribution zone defined by the outer periphery thereof is preferably less than the corresponding total cross-sectional area of the secondary distributor(s). The cross sectional area of a primary distributor is small relative to cross sectional area of the or each secondary distributor and thus regulates the flow to the or each secondary distributor well even when tilted or in motion. The use of a low profile design reduces the volume in the distributor, thereby reducing the stresses on the distributor due to the reduced mass of liquid contained therein. The design is easily scalable from small to large column diameters.

The "cross sectional area" of the primary and secondary distributors is the total cross sectional area as defined by the outer periphery thereof including any sections that have been removed to provide vapour flow paths. In other words, the cross sectional area of the primary or of the or each secondary distributor is the area of the region defined by the principle dimensions of the base of the distributors.

The primary distribution zone may comprise two or more primary distributors but, preferably, it comprises one primary distributor. The depth of a primary distributor is preferably more than the depth of the or each secondary distributor. The degree to which the amount of liquid head is affected by tilting the liquid distributor is less in a long, narrow primary distributor than it is in a shorter, wider primary distributor. The preferred arrangement is, therefore, a tall narrow primary distributor combined with wider secondary distributor(s). The secondary distributor(s) must be wider in order to spread the liquid out over an area.

A primary distributor may not include any packing but, in preferred embodiments, it is at least partially filled with packing to dampen down liquid movement that may be induced by the motion of the distributor. The or each secondary distributor may also be at least partially filled with packing for the same reason. Where packing is used, the packing is usually random packing, although it is also possible to use structured packing.

Wherein the diameter of the column is no more than the characteristic length, said liquid distributor preferably comprises one secondary distributor. Whereas, where the diameter of the column is more than the characteristic length, liquid distributor preferably comprises a plurality of secondary distributors.

The secondary distributors on one side of the column could be connected to regulating apertures on the opposite side of the primary distributor thus helping to place slightly more liquid on the upper side of the column when the column is tilted but not in motion.

The liquid distributor may comprise a plurality of secondary distributors in an arrangement having a core secondary distributor surrounded by at least one ring of secondary distributors, said ring being concentric with the core secondary distributor. In another embodiment, the liquid distributor comprises a plurality of secondary distributors in a "chess board" arrangement.

The liquid distribution apertures are preferably arranged in a plurality of lines and the or each secondary distributor further comprises a liquid flow divider between at least two of said lines. For example, apertures may be located in the bottom of a channel in an open liquid distributor or in the bottom of a pipe or tube in a closed liquid distributor.

The or each secondary distributor preferably comprises a plurality of liquid distribution apertures distributed evenly about a base of thick plate material. The expression "thick plate material" is intended to refer to material having a thickness which is greater than the diameter of each aperture. Preferably, the material is at least twice as thick as the aperture diameter. Such thickness helps to keep the streams directed towards the desired point on the packing even when the distributor is tilted or in motion.

In a preferred embodiment, the liquid distributor has one secondary distributor having a receptacle comprising a base and a peripheral wall, the plurality of liquid distribution apertures being provided in the base. The secondary distributor provides at least one vapour flow path between the bottom and the top of the secondary distributor.

The or at least one secondary distributor may be divided into two or more compartments, each compartment being in fluid communication with each other compartment within said secondary distributor. In one embodiment, the secondary distributor may be substantially circular having a number of sectors, each sector being a compartment. The "secondary length" is the length of a compartment.

The or each secondary distributor comprises an arrangement of liquid distribution apertures which is preferably tailored to co-operate with a specific arrangement of structured column packing to improve liquid distribution. For example, where the column is packed with a plurality of vertical sheets of structured packing arranged in parallel, the liquid distribution apertures may be arranged in a plurality of parallel rows, said rows being orientated so as to traverse the planes of said packing sheets.

The or each secondary distributor is preferably fed from the primary distributor via a plurality of openings in the base of the primary distributor. The apertures are usually evenly distributed in a region of the primary distributor base and regulate flow of liquid from the primary distributor to the secondary distributor(s). By keeping the regulating apertures very close together, the flow to each secondary distributor is kept very similar and using a reasonable liquid head, e.g. 1.0 m, mitigates the effect of this part of the distributor being tilted. If the diameter of the column is less than the characteristic length (as hereinafter defined) of the secondary distributor, these regulating apertures may not be required and the distributor may be simplified by making the secondary distributor become a part of the primary distributor.

The liquid distributor may be an open system but, in order to prevent unwanted spillage of liquid from the distributor on to the column, the liquid distributor is preferably a closed system. For example, the secondary distributor(s) could be formed from closed pipes. A closed distributor may be pressurised which further mitigates the adverse effects of movement of the distributor out of horizontal alignment. In such an embodiment, there is no discontinuity between the inlet of the primary distributor and the outlet apertures of the or each secondary distributor and the liquid distributor may be filled with liquid.

If the distributor is a closed system then it is important for the distributor to have the facility to allow vapour to escape. Otherwise, the distributor might "vapour lock" where vapour becomes trapped inside the distributor with no way out.

The liquid distributor may be used in any situation where liquid needs to be distributed uniformly over an area and, in particular, in situations where the distributor is likely to be tilted, moved and/or rotated out of horizontal alignment. For example, the distributor is particularly useful in conjunction with a liquid-vapour separation column mounted on a ship or other off-shore floating platform for applications such as cryogenic air separation and methane washing. The apparatus including the distributor is preferably adapted and/or constructed to distribute a cryogenic liquid.

Whilst the secondary distributors are located at the top of the separation column, the primary distributor may be located either inside or outside the column.

The total cross sectional area of the secondary distributor (s) may be from 60% to 95%, preferably about 90%, of the cross sectional area of the column.

In embodiments of the liquid distributor comprising one secondary distributor, said secondary distributor may be an integral part of the primary distribution zone.

Preferably, the liquid distributor is a closed distributor and may be filled with liquid.

The apparatus may further comprise a re-distributor assembly provided at an intermediate location in the liquid-vapour separation column between packing sections. Such a re-distributor assembly may comprise a liquid re-distributor having a conventional design. Preferably, however, the liquid re-distributor conforms to the same criteria as the distributor, that is it comprises a primary distribution zone and at least one secondary distributor, the primary distribution zone being in fluid communication with the or each secondary distributor and the or each secondary distributor having a plurality of liquid distribution apertures providing fluid communication between the liquid distributor and the portion of the column below the redistributor. The distance between the two apertures that are furthest apart in the or each secondary distributor (the "characteristic length") is such that the liquid redistributor provides, at each angle of tilt, a standard deviation of liquid flow rates through the apertures of the or each secondary distributor that is less than a first predetermined maximum for all angles of tilt. In addition, the difference in flow rate between the aperture having maximum liquid flow and the aperture having minimum liquid flow in the or each secondary distributor at each angle of tilt is less than a second predetermined maximum for all angles of tilt. The first and second predetermined maxima being determined by the required degree of liquid-vapour separation. Preferably, the re-distributor has the same features as the liquid distributor. The liquid re-distributor may have any or all of the features of the liquid distributor discussed herein in any combination.

The column is preferably packed with sheets of structured packing. The sheets may be arranged in many different ways, see for example U.S. Pat. No. 5,984,282. The simplest arrangement is where all the sheets are aligned such that each sheet is parallel to its neighbouring sheet(s). However, the column is preferably packed in a plurality of sections, each section comprising a plurality of structured packing sheets aligned such that each sheet is parallel to its neighbouring sheet(s) within the section but at an angle to the sheets in a neighbouring section.

The interrelationship in the present invention between the arrangement of the or each secondary distributor and the arrangement of the plurality of column sections is preferably such that the uniformity of liquid flux per element is increased relative to that for apparatus not characterised by features (i) and (ii) discussed above. In other words, the arrangement of secondary distributors may be tailored to the arrangement of column packing thereby improving the uniformity of liquid flux per element.

The liquid distributor preferably has a secondary distributor for each section although, where the column is packed in a plurality of sections, the or each secondary distributor may be provided to distribute fluid to more than one section.

Where the sections are, in fact, sectors arranged about the longitudinal axis of the column, each sector preferably comprises a plurality of vertical sheets of structured packing arranged in parallel in tangential planes to the column axis. The liquid distribution apertures may be arranged in a plurality of rectilinear lines extending radially from the column axis. The lines preferably traverse the planes of said packing sheets.

FIG. 1 depicts a secondary distributor 10 partially filled with a liquid 12 that is being distributed as a series of streams 14. The secondary distributor 10 is packed 16 to reduce the movement of the liquid 12 within the distributor. The characteristic length ("$l_c$") may be defined as the distance between the two distribution apertures that are furthest apart in a secondary distributor such that the liquid distributor provides a standard deviation of liquid flow rates through the apertures of the secondary distributor that is less than a first maximum figure and a difference between the maximum and minimum liquid flow rates through any two apertures of the secondary distributor that is less than a second maximum figure. The first and second maximum figures depend on and are determined by the required degree of vapour-liquid separation, the degree to which the column is tilted and the pattern of the apertures in the secondary distributor.

Figure 2:
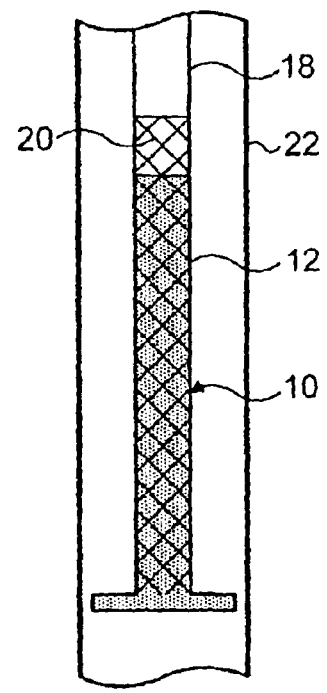
FIG. 2 is a diagrammatic cross-sectional representation of an embodiment of the present invention designed to irrigate a column having a diameter about equal to the characteristic length of the secondary distributor.

In FIG. 2, a primary distributor 18 is in fluid communication with one secondary distributor 10. The primary distributor 18 is packed 20 to restrict the movement of the liquid 12 within the liquid distributor and is located within the column 22 which has a diameter of about the characteristic length of the secondary distributor 10.

Figure 3:
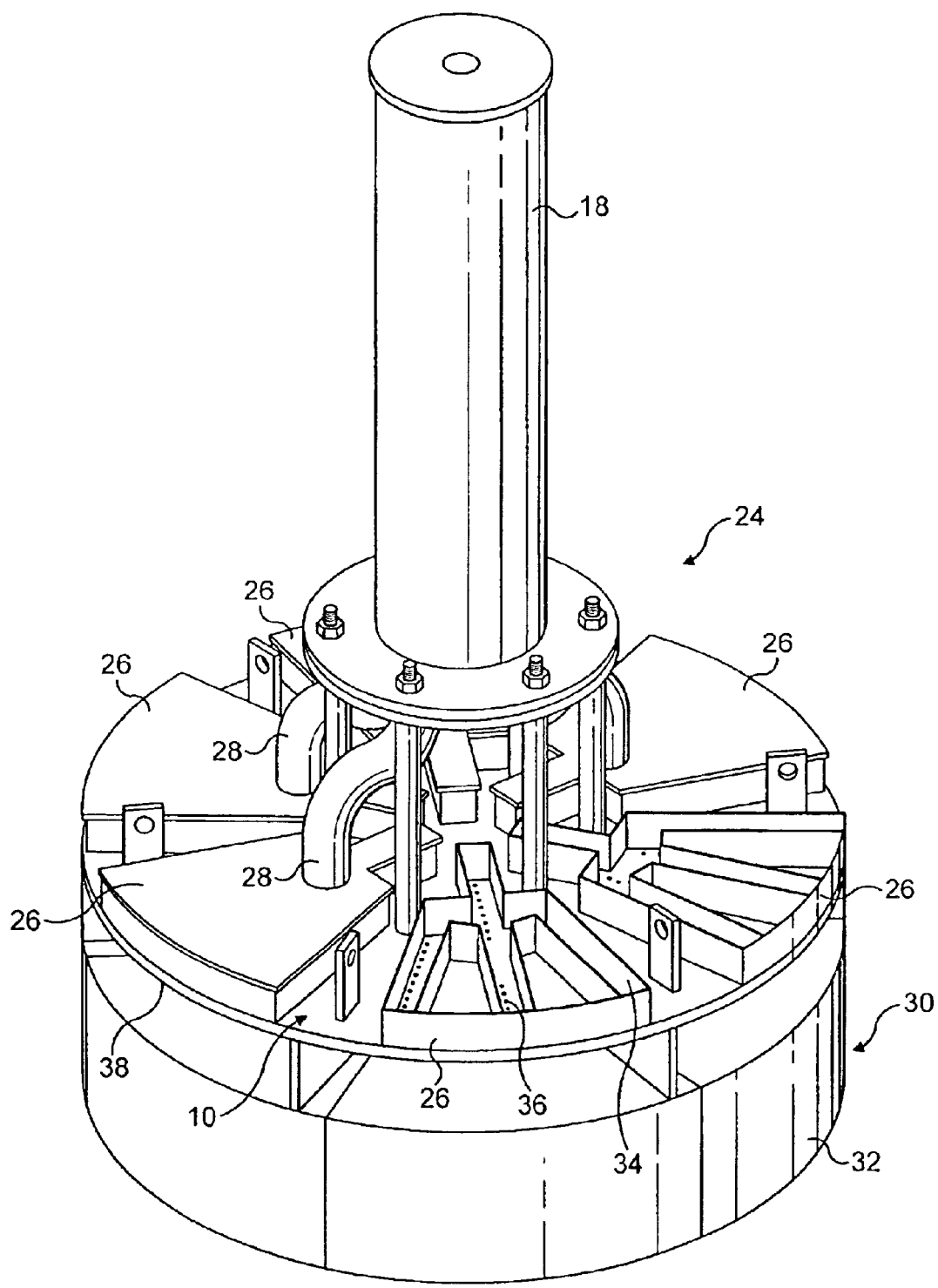
FIG. 3 is a representation of one possible liquid distributor according to FIG. 2.

FIG. 3 depicts a liquid distributor 24 that would normally be used in combination with a ship-based liquid-vapour contact column where the column diameter is no more than the characteristic length of the secondary distributor 10. The liquid distributor 24 comprises a primary distributor 18 and one secondary distributor 10 having six compartments 26, each compartment 26 having a secondary length of about half of the characteristic length. The primary distributor 18 is in fluid communication with each compartment 26 of the secondary distributor 10 via a pipe 28. The liquid distributor 24 is positioned on the top layer of packing 30 of a cryogen distillation column (not shown). Each level of packing in the column consists of six equal sectors 32 arranged about the longitudinal axis of the column. Each sector 32 comprises a plurality of vertical sheets of structured packing material (not shown) arranged in parallel in tangential planes to the column axis. Each compartment 26 distributes liquid to one sector 32. The secondary distributor 10 comprises an arrangement of channels 34 that are covered, each channel 34 having an arrangement of apertures 36 in the base 38 of the secondary distributor 10. These apertures are arranged in a number of rectilinear lines extending radially from the column axis and traverse the planes of the packing sheets in the sector supplied by that compartment 26 of the secondary distributor 10. Rising vapour vents (not shown) would be needed if the liquid distributor and column formed a closed system.

Liquid is fed into the primary distributor 18 which reduces the velocity of the liquid and evens out the flow. From the primary distributor 18, liquid flows into the channels 34 of each compartment 26 of the secondary distributor 10 via pipes 28. The liquid then flows out from the secondary distributor 10 via the apertures 36 and on to the top layer of packing 30. The rate of flow from the apertures 36 is substantially equal across the whole liquid distributor 24 when the distributor 24 is in horizontal alignment and the standard deviation of flow rate across the distributor is such that effective separation is still possible even while the distributor is being tilted and moved by the motion of the sea.

Figure 4:
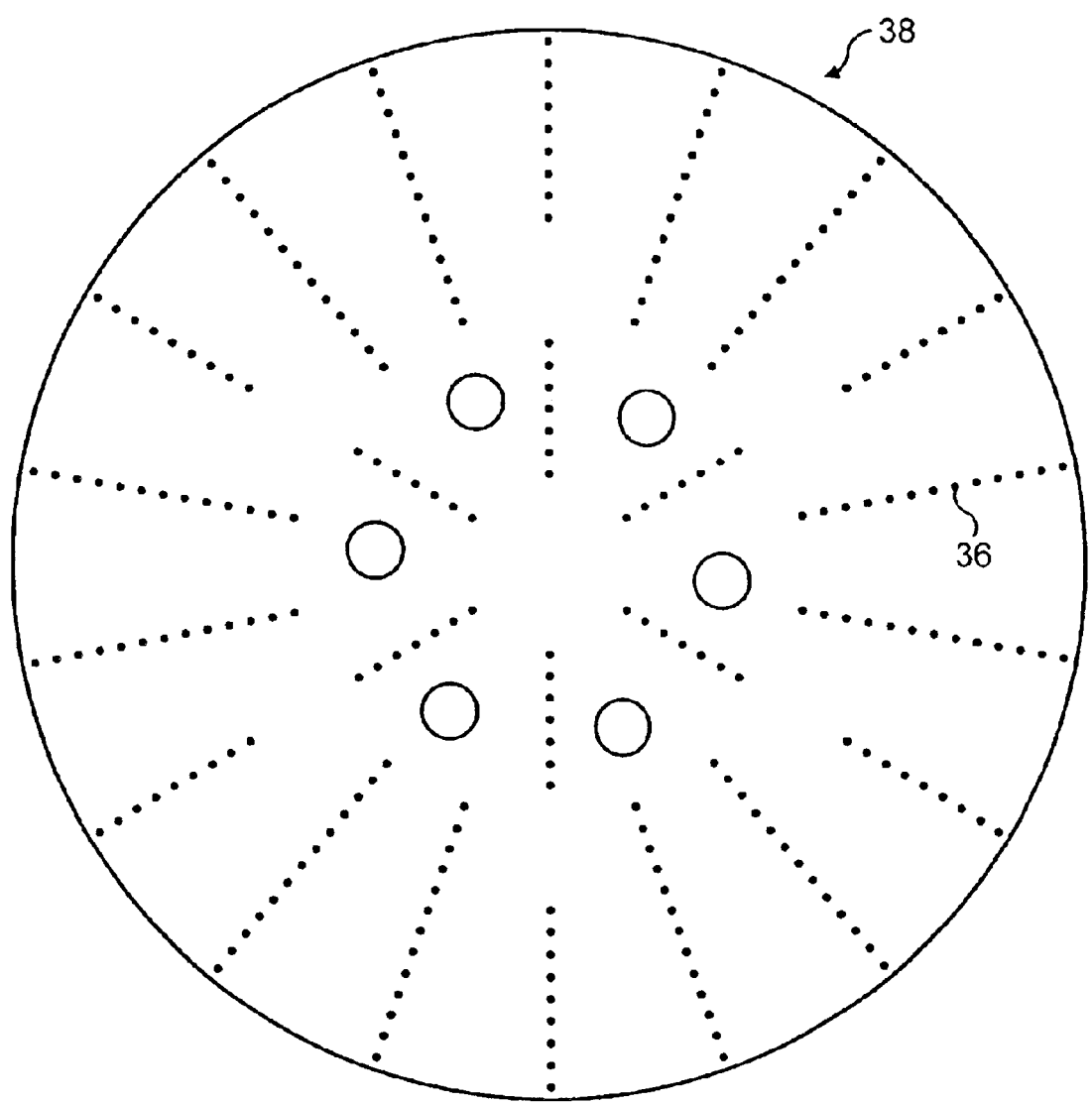
FIG. 4 is a plan view of the base of the secondary distributor depicted in FIG. 3.

FIG. 4 depicts the arrangement of apertures 36 in the base 38 of the secondary distributor 10 of the liquid distributor 24 in FIG. 3. The apertures 36 are arrayed in a plurality of rectilinear lines extending radially from the centre of the secondary distributor 10.

Figure 5:
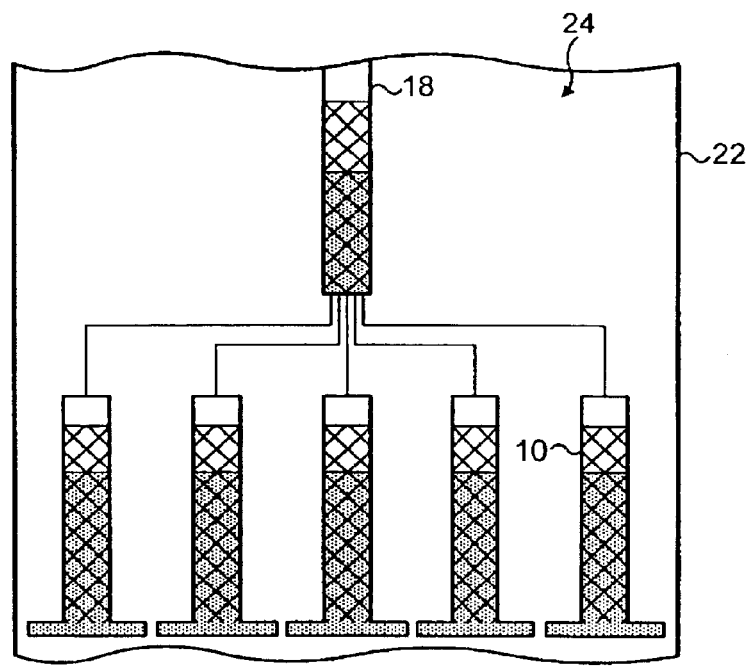
FIG. 5 is a diagrammatic cross-sectional representation of an embodiment of the present invention designed to irrigate a column having a diameter that is five times the characteristic length.

FIG. 5 depicts a liquid distributor 24 for use with a column 22 having a diameter that is about five times the characteristic length of a secondary distributor 10. The liquid distributor comprises a primary distributor 18 located within the column 22 and multiple secondary distributors 10.

Figure 6A:
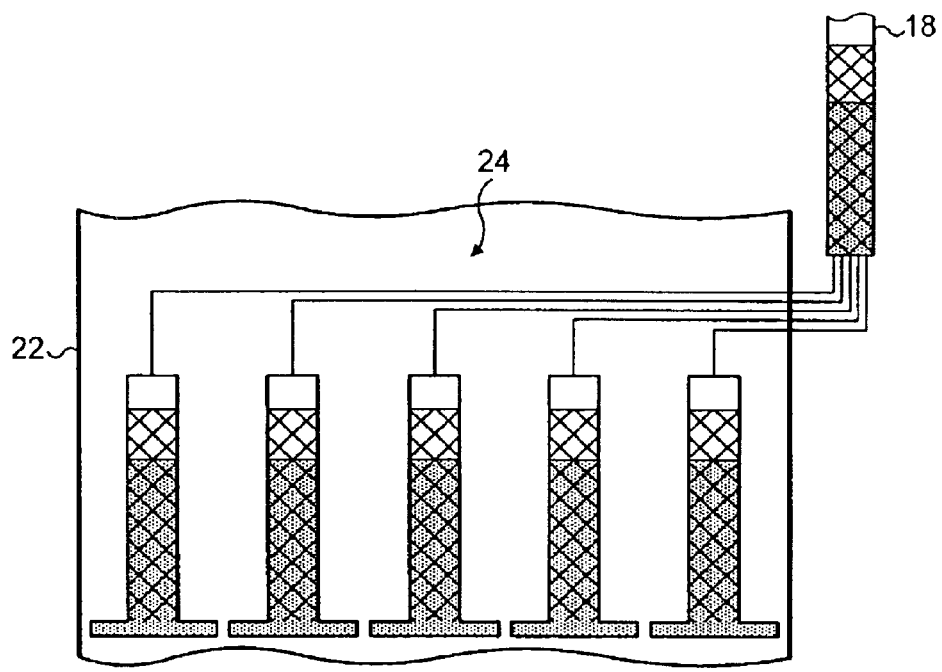
FIG. 6A is a diagrammatic cross-sectional representation of an alternative arrangement of the embodiment depicted in FIG. 5.
Figure 6B:
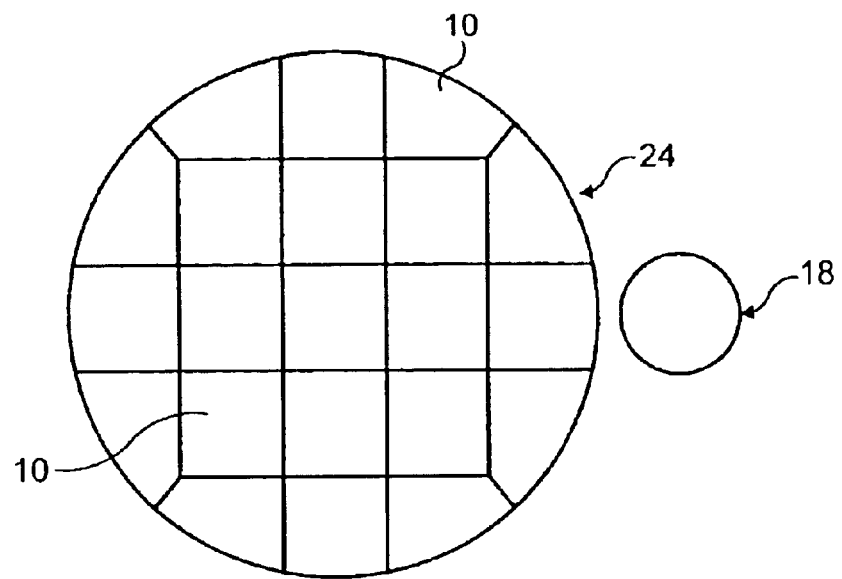
FIG. 6B is a diagrammatic plan view of one possible liquid distributor according to FIG. 6A.

FIG. 6A depicts an alternative arrangement for the liquid distributor 24 shown in FIG. 5. In this arrangement, the primary distributor 18 is located outside the column 22. A plan view of a liquid distributor 24 conforming to this alternative arrangement is depicted in FIG. 6B. The liquid distributor 24 comprises one primary distributor 18, located outside the column, in fluid communication (not shown) with twenty-one secondary distributors 10 arranged in a "chess-board" configuration.

Figure 7A:
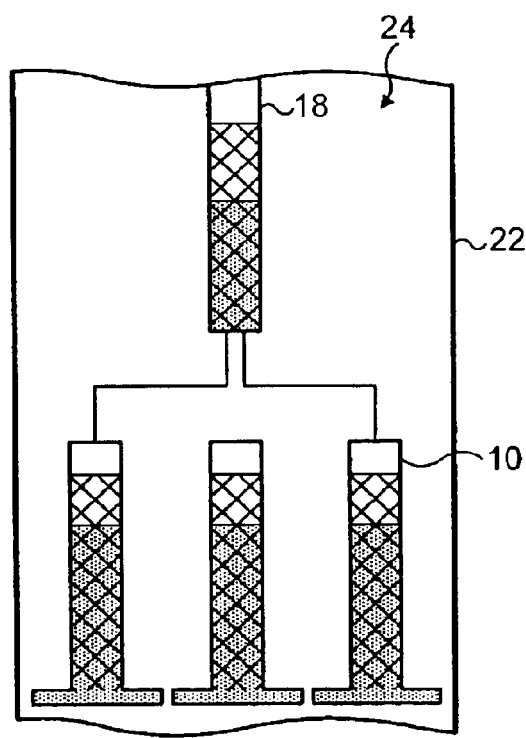
FIG. 7A is a diagrammatic cross-sectional representation of an embodiment of the present invention designed to irrigate a column having a diameter that is three times the characteristic length.

FIG. 7A depicts a liquid distributor 24 for use with a column 22 having a diameter that is about three times the characteristic length of a secondary distributor 10. The liquid distributor 24 comprises a primary distributor 18 located within the column 22 and multiple secondary distributors 10.

Figure 7B:
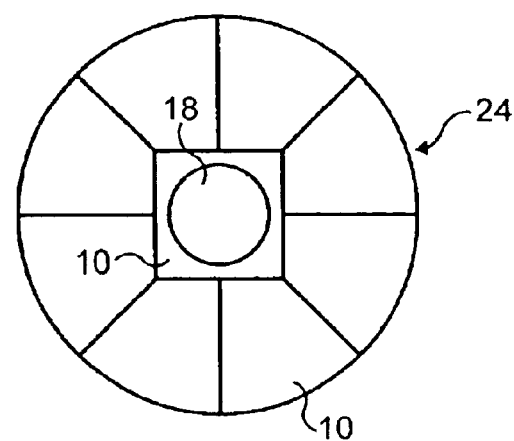
FIG. 7B is a diagrammatic plan view of one possible liquid distributor according to FIG. 7A.
Figure 8:
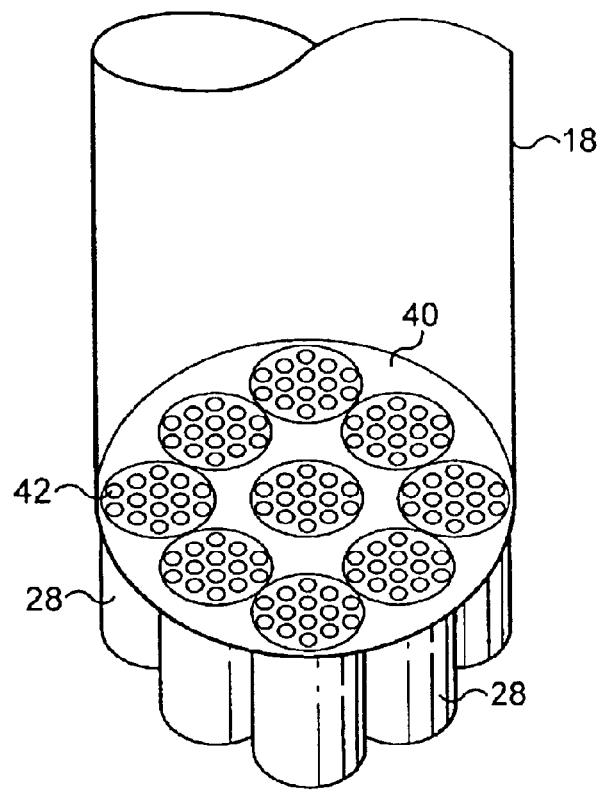
FIG. 8 is a diagrammatic representation of one possible base of the primary distributor in the embodiment depicted in FIGS. 7A and 7B.

FIG. 7B depicts a plan view of a liquid distributor 24 conforming to the arrangement depicted in FIG. 7A. The liquid distributor 24 comprises one primary distributor 18, located inside the column, in fluid communication (not shown) with nine secondary distributors 10, eight of which being arranged in a ring about a core secondary distributor.

A base 40 of a primary distributor 18 (that could be used in the liquid distributor 24 depicted in FIGS. 7A and 7B) is depicted in FIG. 2. Fluid passes from the primary distributor 18, through an array of regulating apertures 42 and into one of the pipes 28. The apertures 42 regulate the flow of the liquid to the secondary distributors (not shown).

Figure 9:
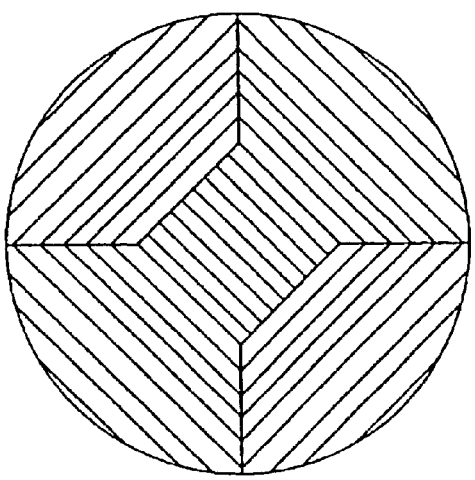
FIG. 9 depicts three examples of different packing arrangements for a liquid-vapour separation column that show how the liquid distributor of the present invention can accommodate different packing arrangements.
Figure 9:
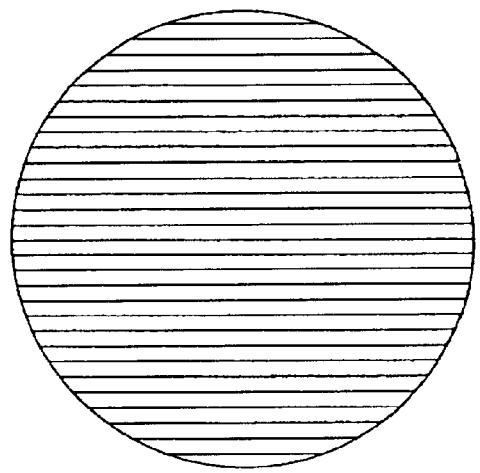
Figure 9:
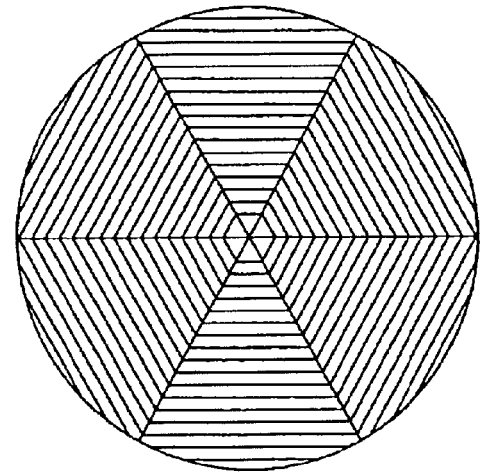

FIG. 9 depicts three arrangements of structured packing for a liquid-vapour separation column. A column can be packed in a single section (e.g. B) or can be packed in multiple sections (e.g. A and C). The liquid distributor of the present invention has particular application in combination with columns packed in multiple sections and such a combination is particularly effective in ship-board applications.

Figure 10:
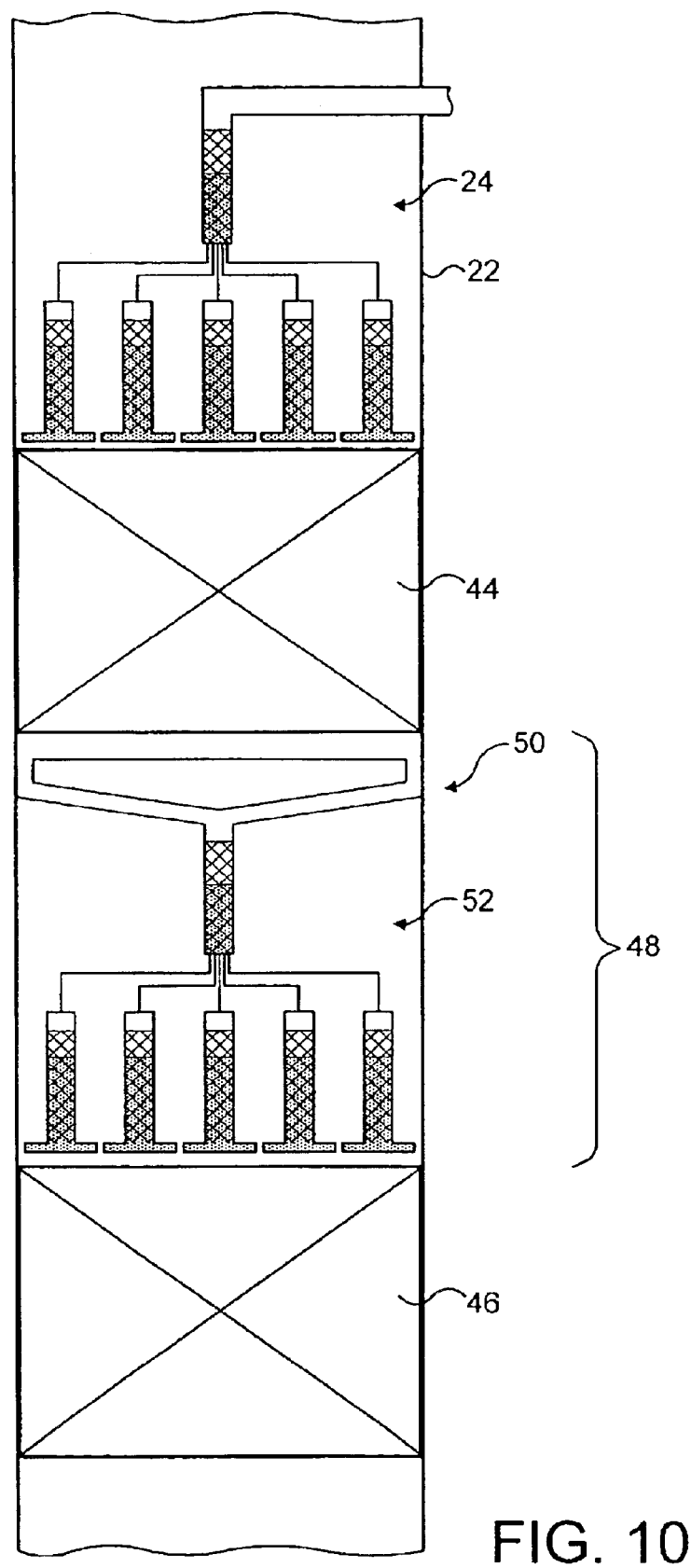
FIG. 10 is a diagrammatic cross-sectional representation of an embodiment of the present invention in which the apparatus has a liquid re-distributor.

FIG. 10 depicts part of a column 22 in cross section. There are two packed sections 44, 46 with a re-distributor assembly 48 located between the sections. The re-distributor assembly 48 comprises a combined liquid collector/vapour re-distributor 50 and a liquid re-distributor 52, shown here as having the substantially the same design as the distributor 24 (see FIG. 5). The liquid re-distributor assembly 48 is used to improve the separation efficiency of long sections of packing by breaking a section into smaller sub-sections. The longer the section of packing, the less uniform the flow of liquid (and vapour). Between each sub-section of packing 44, 46 the re-distributor assembly 48 simply collects the descending liquid and redistributes it evenly. The vapour may be re-distributed at this point. The importance of the redistribution of the fluids becomes even more important for columns that are in motion or tilting permanently.

The liquid distributor of the second aspect is suitable for use in liquid-vapour separation processes. The liquid distributor comprises a primary distributor zone and at least one secondary distributor, said primary distributor zone being in fluid communication with the or each secondary distributor and the or each secondary distributor having a plurality of liquid distribution apertures. The liquid distributor is characterised in that the total cross sectional area of said primary distributor zone defined by the outer periphery thereof is less than the corresponding cross sectional area of the or each secondary distributor. The liquid distributor may comprise any combination of features described herein.

The off-shore floating tiltable platform of the third aspect comprises apparatus comprising, in fluid communication, a liquid distributor and a liquid-vapour separation column. The liquid distributor comprises a primary distribution zone and at least one secondary distributor, said primary distribution zone being in fluid communication with the or each secondary distributor and the or each secondary distributor has a plurality of liquid distribution apertures providing said fluid communication between the liquid distributor and the column. The platform is characterised in that:

(i) the distance between the two apertures that are furthest apart in the or each secondary distributor (the "characteristic length") is such that the liquid distributor provides, at each angle of tilt, a standard deviation of liquid flow rates through the apertures of the or each secondary distributor that is less than a first predetermined maximum for all angles of tilt; and (ii) the difference in flow rate between the aperture having maximum liquid flow and the aperture having minimum liquid flow in the or each secondary distributor at each angle of tilt is less than a second predetermined maximum for all angles of tilt, said first and second predetermined maxima being determined by the required degree of liquid-vapour separation. The apparatus may have any of the features described herein.

EXAMPLES

Example 1

The standard deviation of flow rate has been calculated for a conventional design of liquid distributor (40 mm by 80 mm hole pitch; one primary distributor and one secondary distributor) used in combination with a 1.0 m column and a 4.4 m column tilted to 1° and 4°. The results are shown in Table 1.

If the nature of the separation is such that the optimum flow distribution (for all flows) is to be within +/−4% of the ideal, then the results indicate that, as the liquid distributor is tilted, the maximum and minimum flow rates are significantly outside this criteria for the large liquid distributor at turndown and only marginally inside at full flow.

TABLE 1

|  | Tilt Angle = 1° | Tilt Angle = 4° | Tilt Angle = 1° | Tilt Angle = 4° |
| --- | --- | --- | --- | --- |
| Diameter Full flow | 1.0 m | 1.0 m | 4.4 m | 4.4 m |
| Std. Dev. | 0.2% | 0.9% | 1.0% | 3.9% |
| Max Flow | +0.4% | +1.6% | +1.9% | +7.3% |
| Min Flow | −0.4% | −1.7% | −1.9% | −7.9% |
| Turndown |  |  |  |  |
| Std. Dev. | 0.4% | 1.8% | 1.9% | 7.8% |
| Max Flow | +0.8% | +3.2% | +3.7% | +14.1% |
| Min Flow | −0.8% | −3.4% | −3.9% | −16.4% |

The standard deviation of liquid low rate has also been calculated for a liquid distributor of the present invention having a characteristic length of less than 1.0 m and the results are shown in Table 2.

TABLE 2

|  | Tilt Angle = 1° | Tilt Angle = 4° | Tilt Angle = 1° | Tilt Angle = 4° |
| --- | --- | --- | --- | --- |
| Diameter | 1.0 m | 1.0 m | 4.4 m | 4.4 m |
| Characteristic Length | 0.96 m | 0.96 m | 0.96 m | 0.96 m |
| Full flow |  |  |  |  |
| Std. Dev. | 0.2% | 0.9% | 0.2% | 0.9% |
| Max Flow | +0.4% | +1.6% | +0.4% | +1.6% |
| Min Flow | −0.4% | −1.7% | −0.4% | −1.7% |
| Turndown |  |  |  |  |
| Std. Dev. | 0.4% | 1.7% | 0.4% | 1.7% |
| Max Flow | +0.8% | +3.2% | +0.8% | +3.2% |
| Min Flow | −0.8% | −3.3% | −0.8% | −3.3% |

Assuming the same nature of the separation as for the conventional distributor (such that the optimum flow distribution (for all flows) is to be within +/−4% of the ideal), then the results indicate that, as the liquid distributor is tilted, the maximum and minimum flow rates are well inside the acceptable +/−4% deviation at both full flow and turndown. The standard deviation for a 4.4 m column is essentially that of a 1.0 m column when the new design of distributor is used. This is because the secondary distributors are isolated from each other and so act as though they are irrigating a smaller column.

Example 2

A test rig comprising a liquid distributor (as shown in FIG. 3) having a primary distributor in fluid communication with one secondary distributor (having a characteristic length of 1.0 m and a secondary length of about 0.5 m) was constructed and tested using water as the liquid to be distributed. The liquid distributor was designed to be used with a column having a diameter of 1.0 m and the diameter of the primary distributor was 0.2 m.

The liquid distributor was observed to provide a substantially uniform distribution of liquid across the entire flow area of the column. The results of Example 2 correlate with the calculations of Example 1 for the 1.0 m column.

In the preferred embodiment, the distributor is substantially enclosed (except for the required vapour vents). The use of random packing to dampen down liquid movement within the distributor helps prevent liquid turbulence affecting the flow through the apertures.

It will be appreciated that the invention is not restricted to the details described above with reference to the preferred embodiments but that numerous modifications and variations can be made without departing from the scope of the invention as defined in the following claims.

What is claimed is:

1. An apparatus for liquid-vapour separation processes, said apparatus comprising, in fluid communication, a closed system liquid distributor 24 and a liquid-vapour separation column 22 tiltable from the vertical, said liquid distributor 24 comprising a primary distribution zone 18 and at least one secondary distributor 10, said primary distribution zone 18 being in fluid communication with the or each secondary distributor 10 and the or each secondary distributor 10 having a plurality of liquid distribution apertures 36 providing said fluid communication between the liquid distributor 24 and the column 22, wherein:

(i) the distance between the two apertures that are furthest apart in the or each secondary distributor 10 (the "characteristic length") is such that the liquid distributor 24 provides, at each angle of tilt, a standard deviation of liquid flow rates through the apertures of the or each secondary distributor 10 that is less than a first predetermined maximum for all angles of tilt; and (ii) the difference in flow rate between the aperture having maximum liquid flow and the aperture having minimum liquid flow in the or each secondary distributor 10 at each angle of tilt is less than a second predetermined maximum for all angles of tilt, said first and second predetermined maxima being determined by the required degree of liquid-vapour separation; and at least one of the primary distribution zone and the or each secondary distributor is at least partially filled with packing.

2. The apparatus of claim 1 wherein the liquid distributor 24 provides uniform or substantially uniform liquid flux per element.

3. The apparatus of claim 1 wherein the characteristic length ($l_c$) is calculated according to the following equation:

$$\frac{Q_{i-j}}{Q_{ave}} = A \cdot C_D \left( \sqrt{\frac{2 \cdot \delta \rho}{\rho}} \right) \left( \sqrt{h_i} - \sqrt{h_i - l_c \cdot \sin\theta} \right)$$

where $Q_{i-j}$ = difference in volumetric flow rate between apertures i & j;

$Q_{ave}$ = average flow through the apertures;

A = cross-sectional area of aperture;

$C_D$ = aperture discharge coefficient;

$\delta_\rho$ = difference between liquid and vapour density;

$\rho$ = liquid density; and h = height of liquid above aperture.

θ = angle of distributor tilt.

4. The apparatus of claim 1 wherein the total cross-sectional area of said primary distribution zone 18 defined by the outer periphery thereof is less than the corresponding total cross-sectional area of the secondary distributor(s) 10.

5. The apparatus of claim 1 wherein the diameter of the column 22 is no more than the characteristic length, said liquid distributor 24 comprising one secondary distributor 10.

6. The apparatus of claim 1 wherein the diameter of the column 22 is more than the characteristic length, said liquid distributor 24 comprising a plurality of secondary distributors 10.

7. The apparatus of claim 1 wherein the column 22 is packed in a plurality of sections 32 and the liquid distributor 24 has a separate secondary distributor 10 provided for distributing fluid to each section 32.

8. The apparatus of claim 7 wherein the interrelationship between the arrangement of each secondary distributor 10 and the arrangement of the plurality of column sections 32 is such that the uniformity of liquid flux per element is increased relative to that for apparatus not characterised by features (i) and (ii) defined in claim 1.

9. The apparatus of claim 1 wherein the column is packed in a plurality of sections 32 and the or each secondary distributor 10 is provided to distribute fluid to more than one section 32.

10. The apparatus of claim 1 wherein the liquid distributor 24 comprises a plurality of secondary distributors 10 in an arrangement having a core secondary distributor surrounded by at least one ring of secondary distributors, said ring being concentric with the core secondary distributor.

11. The apparatus claim 1 wherein the liquid distributor 24 comprises a plurality of secondary distributors 10 in a "chess board" arrangement.

12. The apparatus of claim 1 wherein the liquid distribution apertures 36 are arranged in a plurality of lines, the or each secondary distributor 10 further comprising at least one liquid flow divider 34 between at least some of said lines.

13. The apparatus of claim 1 wherein the or each secondary distributor 10 has a base having a thickness that is greater than the diameter of each liquid distribution aperture 36.

14. The apparatus of claim 13 wherein the thickness of the base is at least twice the diameter of each liquid distribution aperture 36.

15. The apparatus of claim 1 wherein the or at least one secondary distributor 10 is divided into two or more compartments 26, each compartment 26 being in fluid communication with each other compartment 26 within said secondary distributor 10.

16. The apparatus of claim 15 wherein the secondary distributor 10 is substantially circular having a number of sectors, each sector being a compartment 26.

17. The apparatus of claim 1 wherein the column 22 is packed in sectors 32 about the longitudinal axis of the column, each sector 32 comprising a plurality of vertical sheets of structured packing arranged in parallel in tangential planes to the column axis and the liquid distribution apertures 36 are arranged in a plurality of rectilinear lines extending radially from the column axis, said lines traversing the planes of said packing sheets.

18. The apparatus of claim 1 wherein the primary distribution zone comprises one primary distributor 18, the or each secondary distributor 10 being fed from the primary distributor 18 via a plurality of openings 42 in the base 40 of the primary distributor 18, said openings 42 being evenly distributed in a region of the primary distributor base 40.

19. The apparatus of claim 18 wherein the primary distributor 18 is located outside the column.

20. The apparatus of claim 1 wherein the total cross sectional area of the secondary distributor(s) 10 is from 60% to 95% of the total cross sectional area of the column 22 with the remaining area being substantially taken up by vapour vents.

21. The apparatus of claim 20 wherein the total cross sectional area of the secondary distributor(s) 10 is about 90% of the cross sectional area of the column 22 with the remaining area being substantially taken up by vapour vents.

22. The apparatus of claim 1 wherein the liquid distributor 24 comprises one secondary distributor 10, said secondary distributor 10 being an integral part of the primary distribution zone 18.

23. The apparatus of claim 1 adapted and/or constructed for cryogenic distillation.

24. The apparatus of claim 1 further comprising a liquid re-distributor 52 provided at an intermediate location in the liquid-vapour separation column 22, said liquid re-distributor 52 having the features of the liquid distributor defined in claim 1.

25. The apparatus of claim 24 wherein the liquid re-distributor 52 comprises the same features as the liquid distributor 24.

26. A closed system liquid distributor 24 for use in liquid-vapour separation processes, said liquid distributor 24 comprising a primary distributor zone 18 and at least one secondary distributor 10, said primary distributor zone 18 being in fluid communication with the or each secondary distributor 10 and the or each secondary distributor 10 having a plurality of liquid distribution apertures 36, wherein:

the total cross sectional area of said primary distributor zone 18 defined by the outer periphery thereof is less than the corresponding cross sectional area of the or each secondary distributor 10; and at least one of the primary distribution zone and the or each secondary distributor is at least partially filled with packing.

27. An off-shore floating tiltable platform comprising apparatus that comprises, in fluid communication, a closed system liquid distributor 24 and a liquid-vapour separation column 22, said liquid distributor 24 comprising a primary distribution zone 18 and at least one secondary distributor 10, said primary distribution zone 18 being in fluid communication with the or each secondary distributor 10 and the or each secondary distributor 10 has a plurality of liquid distribution apertures 36 providing said fluid communication between the liquid distributor 24 and the column 22, wherein:

(i) the distance between the two apertures that are furthest apart in the or each secondary distributor (the "characteristic length") is such that the liquid distributor provides, at each angle of tilt achieved during use, a standard deviation of liquid flow rates through the apertures of the or each secondary distributor that is less than a first predetermined maximum for all angles of tilt achieved during use; and (ii) the difference in flow rate between the aperture having maximum liquid flow and the aperture having minimum liquid flow in the or each secondary distributor at each angle of tilt is less than a second predetermined maximum for all angles of tilt achieved during use, said first and second predetermined maxima being determined by the required degree of liquid-vapour separation; and at least one of the primary distribution zone and the or each secondary distributor is at least partially filled with packing.

28. Use of apparatus comprising, in fluid communication, a closed system liquid distributor 24 and a liquid-vapour separation column 22 tiltable from the vertical, said liquid distributor 24 comprising a primary distribution zone 18 and at least one secondary distributor 10, said primary distribution zone 18 being in fluid communication with the or each secondary distributor 10 and the or each secondary distributor 10 having a plurality of liquid distribution apertures 36 providing said fluid communication between the liquid distributor 24 and the column 22, wherein:

(i) the distance between the two apertures that are furthest apart in the or each secondary distributor 10 (the "characteristic length") is such that the liquid distributor 24 provides, at each angle of tilt acheived during use, a standard deviation flow rates through the apertures of the or each secondary distributor 10 that is less than a first predetermined maximum for all angles of tilt acheived during use; and (ii) the difference in flow rate between the aperture having maximum liquid flow and the aperture having minimum liquid flow in the or each secondary distributor 10 at each angle of tilt acheived during use is less than a second predetermined maximum for all angles of tilt, said first and second predetermined maxima being determined by the required degree of liquid-vapour separation; and at least one of the primary distribution zone and the or each secondary distributor is at least partially filled with packing to provide uniform or substantially uniform liquid flux per element.

29. A method of producing a liquid distributor for use off shore in combination with a vapour liquid separation column for a vapour liquid separation, said distributor to comprise a primary distribution zone 18 and at least one secondary distributor 10, said primary distribution zone 18 to be in fluid flow communication with the or each secondary distributor 10 and the or each secondary distributor 10 to have an arrangement of a plurality of liquid distribution apertures 36; said method comprising:

determining the thermodynamic difficulty of said vapour liquid separation;

determining a first pre-determined maximum standard deviation of flow rates through the apertures of the or each secondary distributor 10 for all angles of tilt to achieve said vapour liquid separation;

determining a second pre-determined maximum difference in flow rate between the aperture to have maximum flow and the aperture to have minimum flow in the or each secondary distributor for all angles of tilt to achieve said vapour liquid separation;

calculating the maximum distance (the "characteristic length") between the two apertures to be located furthest apart in the or each secondary distributor such that the distributor provides, at each angle of tilt acheived during use, (i) a standard deviation of flow rates through the apertures of the or each secondary distributor that is less than the first pre-determined maximum for all angles of tilt acheive during use; and a difference in flow rate between the aperture to have maximum liquid flow and the aperture to have minimum liquid flow in the or each secondary distributor that is less than the second pre-determined maximum for all angles of tilt acheived during use;

preparing a design of a liquid distribution having the characteristic length; and manufacturing the liquid distributor to the design.

30. The method according to claim 29 further comprising tailoring the arrangement of liquid distribution apertures in the or each secondary distributor to co-operate with an arrangement of structured packing in a vapour liquid separation column.

* * * * *